(12) United States Patent
Nakano et al.

(10) Patent No.: US 7,838,591 B2
(45) Date of Patent: Nov. 23, 2010

(54) PROCESS FOR PRODUCING VULCANIZED MOLDED ARTICLE OF RUBBER COMPOSITION, AND VIBRATION-PROOF MATERIAL

(75) Inventors: Sadayuki Nakano, Ichihara (JP); Tatsuo Sassa, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/283,727

(22) Filed: Nov. 22, 2005

(65) Prior Publication Data
US 2006/0178492 A1 Aug. 10, 2006

(30) Foreign Application Priority Data
Feb. 8, 2005 (JP) .............................. 2005-031359
Jul. 27, 2005 (JP) .............................. 2005-217017

(51) Int. Cl.
*C08C 19/00* (2006.01)
*C08F 4/68* (2006.01)
*C08F 210/18* (2006.01)

(52) U.S. Cl. ..................... 524/581; 524/554; 526/169.2; 526/336

(58) Field of Classification Search ............... 526/169.2, 526/336; 524/554, 581
See application file for complete search history.

(56) References Cited

FOREIGN PATENT DOCUMENTS

| JP | 6-25484 A | 2/1994 |
| JP | 2857198 B2 | 11/1998 |

OTHER PUBLICATIONS

English language translation of JP 06-025484; publication date: 19940201.*
CAPLUS Abstract of JP 2003040934, published 20030213.*
English language translation of JP 2003-40934; publication date: Feb. 13, 2003.*

* cited by examiner

*Primary Examiner*—Fred M Teskin
(74) *Attorney, Agent, or Firm*—Sughrue Mion, PLLC

(57) ABSTRACT

A process for producing a vulcanized molded article of a rubber composition, which comprises the steps of (1) kneading, at least, 100 parts by weight of a defined ethylene-α-olefin-non-conjugated polyene copolymer rubber (A), 1 to 150 parts by weight of a reinforcement (B), and 1 to 150 parts by weight of a softener (C), (2) mixing the resultant kneaded product with 0.1 to 10 parts by weight of a vulcanizing agent (D), and (3) hot forming the resultant rubber composition; and a vibration-proof material comprising a vulcanized molded article of a rubber composition produced by the above process.

6 Claims, No Drawings

PROCESS FOR PRODUCING VULCANIZED MOLDED ARTICLE OF RUBBER COMPOSITION, AND VIBRATION-PROOF MATERIAL

FIELD OF THE INVENTION

The present invention relates to a process for producing a vulcanized molded article of a rubber composition, and a vibration-proof material.

BACKGROUND OF THE INVENTION

JP 6-25484A discloses a rubber composition used for making a vibration-proof material, the rubber composition comprising an ethylene-α-olefin-non-conjugated diene copolymer rubber, which satisfies the following conditions (a) to (e):

(a) said copolymer rubber contains 60 to 90 parts by weight of an ethylene unit and 10 to 40 parts by weight of an α-olefin unit, wherein the total amount of both units is 100 parts by weight;

(b) said copolymer rubber has an iodine value of 3 to 40;

(c) an oil extended rubber composed of 100 parts by weight of said copolymer rubber and 70 parts by weight of an extender oil has a Mooney viscosity ($ML_{1+4}$ 121° C.) of 25 to 70;

(d) said oil extended rubber has a stress-relaxation rate of 0.19 or lower; and (e) said copolymer rubber contains 0.5 to 50% by weight of xylene-insoluble matter at 100° C., wherein the amount of said copolymer rubber is 100% by weight.

SUMMARY OF THE INVENTION

However, there is a problem in that a vibration-proof material made from the above-mentioned rubber composition is insufficient in its vibration-proof performance.

In view of the above-mentioned problem in the conventional art, the present invention has an object to provide (1) a process for producing a superior vibration-proof performance-having vulcanized molded article of a rubber composition from a superior moldability-having rubber composition, and (2) a vibration-proof material comprising said vulcanized molded article of a rubber composition.

The present invention is a process for producing a vulcanized molded article of a rubber composition, which comprises the steps of:

(1) kneading, at least, 100 parts by weight of an ethylene-α-olefin-non-conjugated polyene copolymer rubber (A), 1 to 150 parts by weight of a reinforcement (B), and 1 to 150 parts by weight of a softener (C), thereby producing a kneaded product;

(2) mixing said kneaded product with 0.1 to 10 parts by weight of a vulcanizing agent (D), thereby producing a rubber composition; and (3) hot forming said rubber composition, thereby producing a vulcanized molded article, wherein the ethylene-α-olefin-non-conjugated polyene copolymer rubber (A):

is produced by polymerizing ethylene, an α-olefin having 3 to 20 carbon atoms and a non-conjugated polyene in the presence of a catalyst made from a combination of a catalyst component having an average composition represented by the following formula (I) with an organoaluminum compound as a co-catalyst component represented by the following formula (II);

contains 50 to 90% by mole of an ethylene unit and 10 to 50% by mole of an α-olefin unit, the total amount of both units being 100% by mole;

has an iodine value of 1 to 50; and has an intrinsic viscosity of 1.5 to 10 dl/g measured in tetrahydronaphthalene at 135° C.,

$$VO(OR)_m(OR')_nX_{3-m-n} \quad (I)$$

$$R''_kAlX_{3-k} \quad (II)$$

wherein R is an at least secondary hydrocarbon group having 1 to 8 carbon atoms; R' is a linear hydrocarbon group having 1 to 8 carbon atoms; X is a halogen atom; each of m and n is a positive number satisfying m+n≦3; R" is a hydrocarbon group; and k is an integer satisfying 0≦k≦3.

Also, the present invention is a vibration-proof material comprising a vulcanized molded article of a rubber composition produced according to the above-mentioned process.

The above-mentioned materials (A), (B), (C) and (D) are hereinafter referred to as "component (A)", "component (B)", "component (C)" and "component (D)", respectively.

DETAILED DESCRIPTION OF THE INVENTION

Examples of the above-mentioned R, R' and R" are a methyl group, an ethyl group, a n-propyl group, an isopropyl group, a n-butyl group, an isobutyl group, a n-pentyl group, an isopentyl group, a n-hexyl group, an isohexyl group, a n-heptyl group, an isoheptyl group, a n-octyl group, and an isooctyl group. Among them, preferred is a n-propyl group or an isopropyl group.

Examples of the above-mentioned X are a fluorine atom, a chlorine atom, a bromine atom and an iodine atom. Among them, preferred is a chlorine atom.

An example of a process for producing the catalyst component represented by the formula (I) is a process comprising the step of reacting a vanadium compound having an average composition represented by the following formula (III) with a primary alcohol having 1 to 8 carbon atoms,

$$VO(OR)_pX_{3-p} \quad (III),$$

wherein R is an at least secondary hydrocarbon group having 1 to 8 carbon atoms; X is a halogen atom; and p is an integer satisfying 0≦p≦3.

Examples of the above-mentioned primary alcohol having 1 to 8 carbon atoms are methyl alcohol, ethyl alcohol, propyl alcohol, butyl alcohol, pentyl alcohol, hexyl alcohol, heptyl alcohol, and octyl alcohol.

The "average composition" in the formulas (I) and (III) means an average composition of various compositions of compounds represented by the respective formulas (I) and (III), because not all of those compounds represented by the respective formulas (I) and (III) have the same composition as one another.

The positive number of m in the formula (I) is preferably 0.5 to 2. When the positive number is smaller than 0.5, the rubber composition produced in the step (2) is insufficient in its moldability. When the positive number is larger than 2, a vibration-proof material may be inferior in its compressive permanent strain.

The positive number of n in the formula (I) is preferably 1 or 2. When the positive number is smaller than 1, a vibration-proof material may be inferior in its compressive permanent strain. When the positive number is larger than 2, the rubber composition produced in the step (2) is insufficient in its moldability.

Examples of the compound represented by the formula (I) are VO(Oiso-$C_3H_7$)(OEt)Cl, VO(Oiso-$C_3H_7$)(OEt)$_2$, VO(Oiso-$C_3H_7$)$_{0.5}$(OEt)$_{1.5}$Cl, VO(Oiso-$C_3H_7$)$_{1.5}$(OEt)$_{0.5}$Cl, and VO(Oiso-$C_3H_7$)$_{0.8}$(OEt)$_{1.1}$Cl$_{1.1}$, which are known in the art. Among them, particularly preferred is VO(Oiso-$C_3H_7$)$_{0.8}$(OEt)$_{1.1}$Cl$_{1.1}$ in view of ease of its production. Those compounds can be easily produced by a reaction of VOCl$_3$ with a corresponding alcohol, or by a reaction among VOCl$_3$, VO(OR)$_3$ and VO(OR')$_3$, each known in the art.

Examples of the compound as a co-catalyst component represented by the formula (II) are ($C_2H_5$)$_2$AlCl, ($C_4H_9$)$_2$AlCl, ($C_6H_{13}$)$_2$AlCl, ($C_2H_5$)$_{1.5}$AlCl$_{1.5}$, ($C_4H_9$)$_{1.5}$AlCl$_{1.5}$, ($C_6H_{13}$)$_{1.5}$AlCl$_{1.5}$, $C_2H_5$AlCl$_2$, $C_4H_9$AlCl$_2$, and $C_6H_{13}$AlCl$_2$, which are known in the art.

The co-catalyst is used in amount of 2.5 mol or larger per one mol of the catalyst component represented by the formula (I) in order to smoothly polymerize ethylene, an α-olefin having 3 to 20 carbon atoms and a non-conjugated polyene.

The α-olefin in the component (A) has 3 to 20 carbon atoms. Examples of the α-olefin are a linear olefin such as propylene, 1-butene, 1-pentene, 1-hexene, 1-heptene, 1-octene, 1-nonene and 1-decene; a branched olefin such as 3-methyl-1-butene, 3-methyl-1-pentene, and 4-methyl-1-pentene; vinylcyclohexane; and a combination of two or more thereof. Among them, preferred is propylene or 1-butene, and particularly preferred is propylene, in view of ease of availability.

The non-conjugated polyene in the component (A) is preferably a non-conjugated polyene having 3 to 20 carbon atoms. Examples of the non-conjugated polyene are a linear non-conjugated diene such as 1,4-hexadiene, 1,6-octadiene, 2-methyl-1,5-hexadiene, 6-methyl-1,5-heptadiene, and 7-methyl-1,6-octadiene; a cyclic non-conjugated diene such as cyclohexadiene, dicyclopentadiene, 5-vinylnorbornene, 5-ethylidene-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(5-heptenyl)-2-norbornene, 5-(7-octenyl)-2-norbornene, 5-methylene-2-norbornene, 4-ethylidene-8-methyl-1,7-nonadiene, 5,9,13-trimethyl-1,4,8,12-tetradecadiene, 4-ethylidene-12-methyl-1,11-pentadecadiene, and 6-chloromethyl-5-isopropenyl-2-norbornene; a triene such as 2,3-diisopropylidene-5-norbornene, 2-ethylidene-3-isopropylidene-5-norbornene, 2-propenyl-2,2-norbornadiene, 1,3,7-octatriene, 6,10-dimethyl-1,5,9-undecatriene, 5,9-dimethyl-1,4,8-decatriene, 13-ethyl-9-methyl-1,9,12-pentadecatriene, and 1,4,9-decatriene; and a combination of two or more thereof. Among them, preferred is 5-ethylidene-2-norbornene or dicyclopentadiene, or a combination thereof.

The component (A) contains an ethylene unit in an amount of 50 to 90% by mol, and preferably 55 to 88% by mol, and an α-olefin unit in an amount of 10 to 50% by mol, and preferably 12 to 45% by mol, wherein the total amount of both units is 100% by mol. The amount of the ethylene unit of larger than 90% by mol results in deterioration of a low-temperature resistance of a vibration-proof material. The amount of the ethylene unit of smaller than 50% by mol results in insufficient strength of a vibration-proof material. Here, a monomer unit such as the above-mentioned ethylene unit and α-olefin unit means a unit of a polymerized monomer.

The component (A) has an iodine value of 1 to 50, preferably 1 to 40, and more preferably 3 to 35, which is a measure of an amount of a non-conjugated polyene unit contained in the component (A). When the iodine value is smaller than 1, a vulcanization reaction in the step (3) does not proceed smoothly. When the iodine value is larger than 50, a vibration-proof material is poor in its weather resistance.

The component (A) has an intrinsic viscosity, [η], of 1.5 to 10 dl/g, preferably 1.8 to 8 dl/g, and more preferably 2.0 to 5 dl/g measured in tetrahydronaphthalene at 135° C. When the intrinsic viscosity is smaller than 1.5 dl/g, a vibration-proof material is unsatisfactory in its dynamic magnification. When the intrinsic viscosity is larger than 10 dl/g, the rubber composition produced in the step (2) is lowered in its moldability. The above-mentioned dynamic magnification is represented by the following formula:

$$d = K'/K$$

wherein d is dynamic magnification; K is a constant of spring of a vibration-proof material in a static state (namely, static elastic modulus); and K' is a constant of spring thereof in a dynamic state (namely, dynamic elastic modulus). Here, "dynamic state" is a state of a sinusoidal oscillation. The smaller the dynamic magnification is, the better the vibration-proof performance is.

Examples of the component (A) are an ethylene-propylene-5-ethylidene-2-norbornene copolymer, an ethylene-propylene-dicyclopentadiene copolymer, an ethylene-propylene-1,4-hexadiene copolymer, an ethylene-propylene-1,6-octadiene copolymer, an ethylene-propylene-2-methyl-1,5-hexadiene copolymer, an ethylene-propylene-6-methyl-1,5-heptadiene copolymer, an ethylene-propylene-7-methyl-1,6-octadiene copolymer, an ethylene-propylene-cyclohexadiene copolymer, an ethylene-propylene-5-vinylnorbornene copolymer, an ethylene-propylene-5-(2-propenyl)-2-norbornene copolymer, an ethylene-propylene-5-(3-butenyl)-2-norbornene copolymer, an ethylene-propylene-5-(4-pentenyl)-2-norbornene copolymer, an ethylene-propylene-5-(5-hexenyl)-2-norbornene copolymer, an ethylene-propylene-5-(2-heptenyl)-2-norbornene copolymer, an ethylene-propylene-5-(7-octenyl)-2-norbornene copolymer, an ethylene-propylene-5-methylene-2-norbornene copolymer, an ethylene-propylene-4-ethylidene-8-methyl-1,7-nonadiene copolymer, an ethylene-propylene-5,9,13-trimethyl-1,4,8,12-tetradecadiene copolymer, an ethylene-propylene-4-ethylidene-12-methyl-1,11-pentadecadiene copolymer, an ethylene-propylene-6-chloromethyl-5-isopropenyl-2-norbornene copolymer, an ethylene-propylene-2,3-diisopropenyl-5-norbornene copolymer, an ethylene-propylene-2-ethylidene-3-isopropylidene-5-norbornene copolymer, an ethylene-propylene-2-propenyl-2,2-norbornadiene copolymer, an ethylene-propylene-1,3,7-octatriene copolymer, an ethylene-propylene-6,10-dimethyl-1,5,9-undecatriene copolymer, an ethylene-propylene-5,9-dimethyl-1,4,8-decatriene copolymer, an ethylene-propylene-13-ethyl-9-methyl-1,9,12-pentadecatriene copolymer, and an ethylene-propylene-1,4,9-decatriene copolymer; and a combination of two or more thereof. Among them, preferred is an ethylene-propylene-5-ethylidene-2-norbornene copolymer or an ethylene-propylene-dicyclopentadiene copolymer, and more preferred is an ethylene-propylene-5-ethylidene-2-norbornene copolymer.

When the component (A) is a combination of two or more of the above-exemplified copolymers, the above-mentioned amount of an ethylene unit, amount of an α-olefin unit, iodine value, and intrinsic viscosity are those for said combination, respectively.

JP 2003-040934A discloses an example of a process for producing the component (A), which comprises the steps of:

(1) mixing continuously a vanadium compound having an average composition of VO(Oiso-$C_3H_7$)$_{0.8}$Cl$_{2.2}$ with ethanol with a line mixer, thereby producing a catalyst component having an average composition of $VO(Oiso-C_3H_7)_{0.8}(OEt)_{1.1}Cl_{1.1}$;

(2) supplying continuously the catalyst component from a bottom of a polymerization reactor equipped with a stirrer;

(3) simultaneously with that, supplying continuously ethylaluminum sesquichloride (co-catalyst component) from the bottom of the polymerization reactor separately from the supply of the above-mentioned catalyst component;

(4) also simultaneously with that, supplying continuously ethylene, an α-olefin, a non-conjugated polyene, hexane (polymerization solvent) and hydrogen (molecular weight regulator) from the bottom of the polymerization reactor, also separately from the supply of the above-mentioned catalyst component and co-catalyst component, thereby polymerizing them at a constant temperature;

(5) taking continuously a polymerization solution out of the top of the polymerization reactor;

(6) blowing steam continuously into the polymerization solution, thereby coagulating continuously an ethylene-α-olefin-non-conjugated polyene copolymer rubber; and (7) drying the ethylene-α-olefin-non-conjugated polyene copolymer rubber.

The component (B) means a compounding agent blended with a rubber in order to improve a physical property of a vulcanized material of the rubber, such as hardness, tensile strength, modulus, impact resilience, and tear strength, which is described in HANDBOOK OF COMPOUNDING AGENTS FOR RUBBER AND PLASTIC issued by Rubber Digest Co., Ltd. in Apr. 20, 1981. Examples of the component (B) are channel carbon black such as EPC, MPC and CC; furnace carbon black such as SAF, ISAF, HAF, MAF, FEF, SRF, GPF, APF, FF, CF, SCF and ECF; thermal carbon black such as FT and MT; acetylene carbon black; dry-process silica; wet-process silica; synthetic silicate-based silica; colloidal silica; basic magnesium carbonate; active calcium carbonate; heavy calcium carbonate; light calcium carbonate; mica; magnesium silicate; aluminum silicate; a high-styrene resin; a cyclized rubber; a cumarone-indene resin; a phenol-formaldehyde resin; a vinyltoluene copolymer resin; lignin; aluminum hydroxide; and magnesium hydroxide. In order to produce a rubber composition having pre-determined hardness in the step (2), the component (B) is used in an. amount of usually 1 to 150 parts by weight, and preferably 2 to 100 parts by weight, per 100 parts by weight of the component (A).

Examples of the component (C) are process oil, lubricant, paraffin, liquid paraffin, petroleum asphalt, petrolatum, coal tar pitch, caster oil, flaxseed oil, rubber substitute, beeswax, recinoleic acid, palmitic acid, barium stearate, calcium stearate, zinc laurate, and atactic polypropylene. Among them, particularly preferred is process oil such as paraffinic process oil. Process oil used as the component (C) may be added as extender oil to a production step for producing the component (A). Such a combination of the component (A) with process oil produced according to said process is referred to as an extended rubber in a rubber technical field. The component (C) is used in an amount of usually 1 to 150 parts by weight, and preferably 2 to 100 parts by weight, per 100 parts by weight of the component (A), in order to produce a rubber composition having a pre-determined softness in the step (2).

The component (D) is used in order to vulcanize (cross-link) a rubber composition in the step (3). Examples of the component (D) are sulfur; and an organic peroxide such as dicumyl peroxide, 2,5-dimethyl-2,5-di(tert-butylperoxy) hexane, 2,5-dimethyl-2,5-di(benzoylperoxy)hexane, 2,5-dimethyl-2,5-di(tert-butylperoxy)hexyne-3, di-tert-butyl peroxide, di-tert-butylperoxide-3,3,5-trimethylcyclohexane, and tert-butyl hydroperoxide. Among them, particularly preferred is dicumyl peroxide, di-tert-butyl peroxide or di-tert-butylperoxide-3,3,5-trimethylcyclohexane. The component (D) is used in an amount of usually 0.1 to 10 parts by weight, and preferably 0.2 to 8 parts by weight, per 100 parts by weight of the component (A).

Any of the components (A) to (D) may be combined with a component such as a vulcanization accelerator, a vulcanizing auxiliary agent, a processing material, an antioxidant, a resin (for example, polyethylene and polypropylene), and a rubber other than the component (A).

Examples of the above-mentioned vulcanization accelerator are tetramethylthiuram monosulfide, tetramethylthiuram disulfide, tetraethylthiuram disulfide, tetrabutylthiuram disulfide, dipentamethylenethiuram monosulfide, dipentamethylenethiuram disulfide, dipentamethylenethiuram tetrasulfide, N,N'-dimethyl-N,N'-diphenylthiuram disulfide, N,N'-dioctadecyl-N,N'-diisopropylthiuram disulfide, N-cyclohexyl-2-benzothiazole-sufenamide, N-oxydiethylene-2-benzothiazole-sufenamide, N,N-diisopropyl-2-benzothiazole-sufenamide, 2-mercaptobenzothiazole, 2-(2,4-dinitrophenyl)mercaptobenzothiazole, 2-(2,6-diethyl-4-morpholinothio)benzothiazole, dibenzothiazyl-disulfide, diphenylguanidine, triphenylguanidine, diorthotolylguanidine, orthotolyl-bi-guanide, diphenylguanidine-phthalate, a reaction product of acetaldehyde with aniline, a condensation product of butylaldehyde with aniline, hexamethylenetetramine, 2-mercaptoimidazoline, thiocarbanilide, diethylthiourea, dibutylthiourea, trimethylthiourea, diorthotolylthiourea, zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, tellurium diethyldithiocarbamate, zinc dibutylxanthate, and ethylenethiourea. The vulcanization accelerator is used in an amount of usually 0.05 to 20 parts by weight, and preferably 0.1 to 8 parts by weight, per 100 parts by weight of the component (A).

When the component (D) is an organic peroxide, the above-mentioned vulcanizing auxiliary agent may be used. Examples of the vulcanizing auxiliary agent are triallyl isocyanurate, N,N'-m-phenylenebismaleimide, methacrylic acid, methyl methacrylate, ethyl methacrylate, propyl methacrylate, isopropyl methacrylate, n-butyl methacrylate, isobutyl methacrylate, sec-butyl methacrylate, tert-butyl methacrylate, 2-ethylhexyl methacrylate, cyclohexyl methacrylate, isodecyl methacrylate, lauryl methacrylate, tridecyl methacrylate, stearyl methacrylate, 2-hydroxyethyl methacrylate, hydroxypropyl methacrylate, polyethyleneglycol monomethacrylate, polypropyleneglycol monomethacrylate, 2-ethoxyethyl methacrylate, tetrahydrofurfuryl methacrylate, allyl methacrylate, glycidyl methacrylate, benzyl methacrylate, dimethylaminoethyl methacrylate, diethylaminoethyl methacrylate, methacryloxyethyl phosphate, 1,4-butandiol diacrylate, ethyleneglycol dimethacrylate, 1,3-butyleneglycol dimethacrylate, neopentylglycol dimethacrylate, 1,6-hexanediol dimethacrylate, diethyleneglycol dimethacrylate, triethyleneglycol dimethacrylate, polyethyleneglycol dimethacrylate, dipropyleneglycol dimethacrylate, polypropyleneglycol dimethacrylate, trimethylolethane trimethacrylate, trimethylolpropane trimethacrylate, ally glycidyl ether, N-methylolmethacrylamide, 2,2-bis(4-methacryloxypolyethoxyphenyl)propane, aluminum methacrylate, zinc methacrylate, calcium methacrylate, magnesium methacrylate, and 3-chloro-2-hydroxypropyl methacrylate. The vulcanizing auxiliary agent is used in an amount of usually 0.05 to 15 parts by weight, and preferably 0.1 to 8 parts by weight, per 100 parts by weight of the component (A). A further example of the vulcanizing auxiliary agent is a metal oxide such as magnesium oxide and zinc oxide. Among them, preferred is zinc oxide. Said vulcanizing auxiliary agent is used in an amount of usually 0.1 to 20 parts by weight per 100 parts by weight of the component (A).

Examples of the above-mentioned processing material are a fatty acid such as oleic acid, palmitic acid and stearic acid; a metal salt of a fatty acid such as zinc stearate and calcium stearate; a fatty ester; a glycol such as ethylene glycol and polyethylene glycol; and a combination of two or more thereof, which are conventionally used in the art. The processing material is used in an amount of usually 0.2 to 10 parts by weight per 100 parts by weight of the component (A).

Examples of the above-mentioned antioxidant are an aromatic secondary amine stabilizer such as phenylnaphthylamine and N,N'-di-2-naphthylphenylenediamine; a phenol stabilizer such as dibutylhydroxytoluene tetrakis[methylene (3,5-di-tert-butyl-4-hydroxy)hydrocinnamate ]methane; a thioether stabilizer such as bis[2-methyl-4-(3-n-alkylthiopropyonyloxy)-5-tert-butylphenyl]sulfide; a carbamate stabilizer such as nickel dibutyldithiocarbamate; and a combination of two or more thereof, which are usually used in the art. The antioxidant is used in an amount of usually 0.1 to 10 parts by weight per 100 parts by weight of the component (A).

Examples of the above-mentioned rubber other than the component (A) are a natural rubber; a styrene-butadiene rubber; a chloroprene rubber, an acrylonitrile-butadiene rubber; an acrylic rubber; a butadiene rubber; a liquid diene rubber such as a liquid polybutadiene rubber, a modified liquid polybutadiene rubber, a liquid polyisoprene rubber, and a modified liquid polyisoprene rubber; and a combination of two or more thereof.

The kneading in the step (1) can be carried out with a conventional airtight kneading machine such as a Banbury mixer, a kneader and a double-screw extruder.

The mixing in the step (2) can be carried out with a conventional mixer such as a roll (for example, open roll), and a kneader and a double-screw extruder. Since the component (D) does not react essentially in the step (2), a rubber composition produced in the step (2) can be hot formed and also vulcanized.

The step (3) produces a vulcanized molded article of the rubber composition by way of hot forming the rubber composition produced in the step (2) with a molding machine such as an injection molding machine, a compression molding machine and a transfer molding machine at usually 120° C. or higher, and preferably 140 to 220° C. for about one minute to about one hour, wherein a reaction of the component (D) contained in the rubber composition occurs.

A vibration-proof material of the present invention comprises the above-mentioned vulcanized molded article produced in the step (3), and has a shape suitable for a part such as a vehicle part (for example, an engine mount, a muffler hanger, a strut mount, a torsional damper, a change speed lever mount, a torsion rubber for a clutch, a centering bush, a tube damper, a torque bush, a suspension bush, a body mount, a cab mount, a member mount, a strut-bar cushion, a tension-rod bush, an arm bush, a lowering bush, a radiator support, a damper pulley, and a rack mount) and a part of a washing machine; namely, when the above-mentioned vulcanized molded article is used for a vibration-proof material of the present invention, the vulcanized molded article is molded in the step (3) so as to has a shape suitable for the vibration-proof material.

EXAMPLE

The present invention is explained with reference to the following Examples, which do not limit the scope of the present invention.

Example 1

(1) Production of the Component (A)

There were supplied continuously (i) hexane (polymerization solvent) at a rate of 216.6 kg/hour, (ii) ethylene at a rate of 6.23 kg/hour, (iii) propylene at a rate of 6.30 kg/hour, (iv) 5-ethylidene-2-norbornene at a rate of 0.342 kg/hour, and (v) hydrogen (molecular weight regulator) at a rate of 13.7 kg/hour, respectively, from a bottom of a 100 liter stainless-steel polymerization reactor equipped with a stirrer.

Simultaneously with and separately from that, there were supplied continuously (vi) a catalyst component having an average composition of $VO(Oiso-C_3H_7)_{0.8}(OEt)_{1.1}Cl_{1.1}$, which had been produced by supplying continuously to a line mixer (vi-i) a compound having an average composition of $VO(Oiso-C_3H_7)_{0.8}Cl_{2.2}$ at a rate of 0.37 g/hour and (vi-ii) ethanol at a rate of 0.16 g/hour, respectively, said compound (vi-i) having been previously produced by mixing (vi-i-i) 73 parts by mol of $VOCl_3$ and (vi-i-ii) 27 parts by mol of $VO(Oiso-C_3H_7)_3$ and (vii) ethylaluminum sesquichloride (co-catalyst component) at a rate of 6.13 g/hour from the bottom of the above-mentioned polymerization reactor, and polymerization was carried out at 45° C. for 0.7 hour. The obtained polymerization solution was supplied continuously with paraffinic process oil (component (C) as an extender oil) at a rate of 1.15 kg/hour.

The polymerization solution containing the paraffinic process oil was taken continuously out of the top of the polymerization reactor, and then, steam was blown into the polymerization solution to coagulate the copolymer rubber. The coagulated copolymer rubber was dried, and there was produced the oil-extended copolymer rubber containing 100 parts by weight of an ethylene-propylene-5-ethylidene-2-norbornene copolymer rubber (component (A)) and 30 parts by weight of the component (C) as the extender oil at a production rate of 7.1 kg/hour.

The component (A) in the oil-extended copolymer rubber contained an ethylene unit in an amount of 86% by mol, and a propylene unit in an amount of 14% by mol, the total amount of both units being 100% by mol; had an iodine value of 15; had an intrinsic viscosity of 3.5 dl/g measured in tetrahydronaphthalene at 135° C.; and had a ratio of its weight-average molecular weight (Mw) to its number-average molecular weight (Mn), namely, its molecular weight distribution (Mw/Mn) of 5.2.

(2) Step (1)

There were kneaded with one another for 5 minutes with a 1,700 ml-volume Banbury mixer having an initial temperature of 80 at its rotor rotation speed of 60 rpm (i) 130 parts by weight of the above-produced oil-extended copolymer rubber containing 100 parts by weight of the component (A) and 30 parts by weight of the component (C) as the extender oil, (ii) 60 parts by weight of SRF carbon black (component (B)) having a trade name of ASAHI 50G manufactured by Asahi Carbon Co., Ltd., (iii) 60 parts by weight of paraffinic process oil (component (C)) having a trade name of DIANA PS430 manufactured by Idemitsu Kosan Co., Ltd., (iv) 5 parts by weight of zinc oxide (vulcanizing auxiliary agent) having a grade name of TWO KIND, and (v) 1 part by weight of stearic acid (processing material), thereby producing a kneaded product.

(3) Step (2)

There were mixed with one another by use of an open roll (i) the above-produced kneaded product, (ii) 7 parts by weight of dicumyl peroxide (component(D)) having a trade name of PERCUMYL D (40) manufactured by NOF Corporation, and (iii) 0.5 part by weight of sulfur (component(D)), thereby producing a rubber composition, wherein the open roll was composed of a front roll having a diameter of 8 inches and a rotation speed of 15 rpm, and a back roll having a diameter of 8 inches, a rotation speed of 18 rpm and a regulated temperature of 40° C., both rolls having a 4 mm-opening between them. No bagging was observed in this step (2); namely, the rubber composition was wound satisfactorily around both rolls.

(4) Step (3)

The above-produced rubber composition was press-molded at 170° C. for 20 minutes, thereby producing a 2 mm-thick vulcanized sheet.

The sheet had dynamic magnification of 1.89; a rate-of-change ($\Delta$Tb) of its tensile strength between before and after heating in an aging test of ±0%; a rate-of-change ($\Delta$Eb) of its elongation at beak between before and after heating therein of −6%; and a rate-of-change ($\Delta$Hs) of its hardness between before and after heating therein of +4 point. The sheet can be processed to produce a vibration-proof material having a shape suitable for use. Results are summarized in Table 1.

The above-mentioned respective amounts (% by mol) of the ethylene unit and the propylene unit contained in the component (A) were measured according to the following method comprising the steps of:

(1) making an about 0.1 mm-thick film from the above-produced oil-extended copolymer rubber with a hot-press machine;

(2) measuring an infrared adsorption spectrum of the film three times with an infrared spectrometer having a trade name of IR-810 manufactured by JASCO Corporation, thereby obtaining three spectra;

(3) similarly to the above, measuring an infrared adsorption spectrum of a film made from each of three standard polymers (namely, polypropylene, polyethylene and an ethylene-propylene copolymer containing 50% by mol of an ethylene unit and 50% by mol of a propylene unit), thereby obtaining nine spectra in total;

(4) obtaining respective amounts (% by weight) of an ethylene unit and a propylene unit, based on an adsorption peak at 1155 $cm^{-1}$ (methyl branch) of each infrared adsorption spectrum measured above, according to a method described in "Characterization of Polyethylene by Infrared Adsorption Spectrum" written by Takayama and Usami et al, or Die Makromolekulare Chemie, 177, 461 (1976) written by Mc Rae, M. A. and MadamS, W. F. et al, thereby obtaining three values regarding respective amounts (% by weight) of the ethylene unit and the propylene unit contained in the component (A);

(5) averaging respective three values, thereby obtaining an average amount (% by weight) of the ethylene unit contained in the component (A), and an average amount (% by weight) of the propylene unit contained therein, respectively; and (6) converting respective average amounts represented by "% by weight" to respective average amounts represented by "% by mol".

The above-mentioned molecular weight distribution (Mw/Mn) of the component (A) was measured according to the following method, using (i) a gel permeation chromatography apparatus (GPC) having a trade name of 150 C manufactured by Waters Co. Ltd., (ii) a column having a trade name of SHODEX PACKED COLUMN A-80M manufactured by Showa Denko K. K., (iii) polystyrenes having molecular weights between 68-8,400,000 manufactured by Tosoh Corporation as a molecular weight standard reference material, and (iv) a refractivity detector, at an eluted solution-flow rate of 1.0 ml/min, and at an elution temperature of 140° C., which comprises the steps of:

(1) dissolving about 5 mg of a sample in 5 ml of o-dichlorobenzene, thereby obtaining a solution;

(2) injecting 400 micro-litters of the solution;

(3) obtaining Mw and Mn, respectively, converted to those of the polystyrene; and (4) calculating Mw/Mn.

The above-mentioned dynamic magnification was measured according to the following method comprising the steps of:

(1) measuring static shear elastic modulus of the 2 mm-thick vulcanized sheet produced in Example 1, step (3) according to JIS K 6254, JIS being Japanese Industrial Standards;

(2) tripling the static shear elastic modulus, thereby obtaining static elastic modulus (K);

(3) measuring dynamic elastic modulus (K') of the 2 mm-thick vulcanized sheet produced in Example 1, step (3), using an automated vibration-proof performance measuring equipment manufactured by Yoshimizu Co., Ltd., at 23° C. and a vibrational frequency of 100 Hz, with an amplitude of ±0.1%; and (4) obtaining a ratio of the dynamic elastic modulus to the static elastic modulus, K'/K, which is dynamic magnification.

The above-mentioned rate-of-change ($\Delta$ Tb), rate-of-change ($\Delta$Eb), and rate-of-change ($\Delta$Hs) were measured according to JIS K 6257 by the following normal-oven method comprising the steps of:

(1) making a dumbbell-shaped No. 3 specimen from the 2 mm-thick vulcanized sheet produced in Example 1, step (3);

(2) heating the specimen at 140° C. for 70 hours; and (3) measuring $\Delta$Tb, $\Delta$Eb and $\Delta$Hs of the heated specimen with a tension tester having a trade mane of QUICK READER P-57 manufactured by Ueshima Seisakusho Co., Ltd. at an atmospheric temperature of 23° C., and a tensile rate of 500 mm/minute.

Example 2

Example 1 was repeated except that (i) the amount of the SRF carbon black (component (B)) was changed to 50 parts by weight, and (ii) the amount of the paraffinic process oil (component (C)) was changed from 60 parts by weight to 45 parts by weight. Results are summarized in Table 1.

Example 3

Example 1 was repeated except that (i) the amount of the SRF carbon black (component (B)) was changed to 45 parts by weight, and (ii) the amount of the paraffinic process oil (component (C)) was changed from 60 parts by weight to 45 parts by weight. Results are summarized in Table 1.

Example 4

Example 1 was repeated except that (i) the amount of the SRF carbon black (component (B)) was changed to 40 parts by weight, and (ii) the amount of the paraffinic process oil (component (C)) was changed from 60 parts by weight to 40 parts by weight. Results are summarized in Table 1.

Example 5

Example 1 was repeated except that (i) the amount of the SRF carbon black (component (B)) was changed to 35 parts by weight, and (ii) the amount of the paraffinic process oil (component (C)) was changed from 60 parts by weight to 35 parts by weight. Results are summarized in Table 1.

Example 6

Example 1 was repeated except that (i) the amount of the SRF carbon black (component (B)) was changed to 25 parts by weight, and (ii) the amount of the paraffinic process oil (component (C)) was changed from 60 parts by weight to 25 parts by weight. Results are summarized in Table 1.

Example 7

Example 1 was repeated except that (i) the amount of the SRF carbon black (component (B)) was changed to 15 parts by weight, and (ii) the amount of the paraffinic process oil (component (C)) was changed from 60 parts by weight to 15 parts by weight. Results are summarized in Table 1.

Comparative Example 1

(1) Production of Oil-Extended Copolymer Rubber

Example 1, "(1) Production of the component (A)" was repeated except that (i) the catalyst component was changed to $VOCl_3$ supplied at a rate of 0.40 g/hour, (ii) the rate of 1.15 kg/hour of the supplied paraffinic process oil (component (C) as an extender oil) was changed to 2.68 kg/hour, and (iii) the rate of 6.13 g/hour of the supplied ethylaluminum sesquichloride (co-catalyst component) was changed to 6.15 g/hour, thereby producing an oil-extended copolymer rubber containing 100 parts by weight of an ethylene-propylene-5-ethylidene-2-norbornene copolymer rubber, and 70 parts by weight of the extender oil.

The ethylene-propylene-5-ethylidene-2-norbornene copolymer rubber in the oil-extended copolymer rubber contained an ethylene unit in an amount of 86% by mol, and a propylene unit in an amount of 14% by mol, the total amount of both units being 100% by mol; had an iodine value of 15; had an intrinsic viscosity of 3.4 dl/g measured in tetrahydronaphthalene at 135° C.; and had a molecular weight distribution (Mw/Mn) of 2.7.

(2) Step (1)

Example 1, "(2) Step (1)" was repeated except that (i) the oil-extended copolymer rubber was changed to the oil-extended copolymer rubber produced in the above (1) of Comparative Example 1; and (ii) the amount of the paraffinic process oil (component (C)) was changed from 60 parts by weight to 20 parts by weight, thereby producing a kneaded product.

(3) Step (2)

Example 1, "(3) Step (2)" was repeated, thereby producing a rubber composition. Bagging was observed in this step (2); namely, the rubber composition was not wound satisfactorily around both rolls.

(4) Step (3)

Example 1, "(4) Step (3)" was repeated, thereby producing a 2 mm-thick vulcanized sheet.

Results are summarized in Table 1.

Comparative Example 2

(1) Production of Oil-Extended Copolymer Rubber

Comparative Example 1, (1) was similarly repeated.

(2) Step (1)

Comparative Example 1, (2) was similarly repeated.

(3) Step (2)

Example 1, (3) was repeated except that (i) PERCUMYL D (40) was not used, (ii) 0.63 part by weight of 80% purity-carrying tetramethylthiuram disulfide (vulcanization accelerator) having a trade mane of RHENOGRAN TMTD-80 manufactured by Bayer was used, (iii) 1.25 part by weight of 80% purity-carrying zinc di-n-butyldithiocarbamate (vulcanization accelerator) having a trade mane of RHENOGRAN ZDBC-80 manufactured by Bayer was used, (iv) 1.88 part by weight of 80% purity-carrying N-cyclohexyl-2-benzothiazole-sufenamide (vulcanization accelerator) having a trade mane of RHENOGRAN CBS-80 manufactured by Bayer was used, and (v) the amount of sulfur was changed to 1.5 part by weight, thereby producing a rubber composition. Bagging was observed in this step (2); namely, the rubber composition was not wound satisfactorily around both rolls.

(4) Step (3)

Example 1, (4) was repeated, thereby producing a 2 mm-thick vulcanized sheet.

Results are summarized in Table 1.

Based on the above, Examples 1 to 7 had good winding around both rolls and good dynamic magnification, and Comparative Examples 1 and 2 had bad winding around both rolls.

TABLE 1

| | Example | | | | | | | Comparative Example | |
|---|---|---|---|---|---|---|---|---|---|
| | 1 | 2 | 3 | 4 | 5 | 6 | 7 | 1 | 2 |
| Step (1) Component (A) | | | | | | | | | |
| A1(note 1) | 100 | 100 | 100 | 100 | 100 | 100 | 100 | | |
| A2(note 2) | | | | | | | | 100 | 100 |
| Component (B) | | | | | | | | | |
| SFR carbon black | 60 | 50 | 45 | 40 | 35 | 25 | 15 | 60 | 60 |
| Component (C) | | | | | | | | | |
| Extender oil | 30 | 30 | 30 | 30 | 30 | 30 | 30 | 70 | 70 |
| Paraffinic oil | 60 | 50 | 45 | 40 | 35 | 25 | 15 | 20 | 20 |
| Processing material | | | | | | | | | |
| Stearic acid | 1 | 1 | 1 | 1 | 1 | 1 | 1 | 1 | 1 |
| Step (2) Component (D) | | | | | | | | | |
| Percumyl D (40) | 7 | 7 | 7 | 7 | 7 | 7 | 7 | 7 | |
| Sulfur | 0.5 | 0.5 | 0.5 | 0.5 | 0.5 | 0.5 | 0.5 | 0.5 | 1.5 |
| Vulcanization accelerator | | | | | | | | | |
| RHENOGRAN TMTD-80 | | | | | | | | | 0.63 |
| RHENOGRAN ZDBC-80 | | | | | | | | | 1.25 |
| RHENOGRAN CBS-80 | | | | | | | | | 1.88 |
| Evaluation | | | | | | | | | |
| Winding around both rolls | good | good | good | good | good | good | good | bad | bad |
| Dynamic magnification | 1.89 | 1.81 | 1.73 | 1.76 | 1.69 | 1.63 | 1.60 | 1.89 | 1.65 |
| Aging test | | | | | | | | | |
| ΔTb (%) | ±0 | +9 | +9 | +8 | +7 | +10 | +21 | +4 | −39 |
| ΔEb (%) | −6 | −4 | −4 | −5 | −6 | −5 | −4 | −7 | −40 |
| ΔHs (point) | +4 | +4 | +3 | +4 | +4 | +3 | +3 | +4 | +7 |

Note 1:
A1 is an ethylene-propylene-5-ethylidene-2-norbornene copolymer rubber containing an ethylene unit in an amount of 86% by mol, and a propylene unit in an amount of 14% by mol, the total amount of both units being 100% by mol; having an iodine value of 15; having an intrinsic viscosity of 3.5 dl/g measured in tetrahydronaphthalene at 135° C.; and having a molecular weight distribution (Mw/Mn) of 5.2.

Note 2:
A2 is an ethylene-propylene-5-ethylidene-2-norbornene copolymer rubber containing an ethylene unit in an amount of 86% by mol, and a propylene unit in an amount of 14% by mol, the total amount of both units being 100% by mol; having an iodine value of 15; having an intrinsic viscosity of 3.4 dl/g measured in tetrahydronaphthalene at 135° C.; and having a molecular weight distribution (Mw/Mn) of 2.7.

The invention claimed is:

1. A process for producing a vulcanized molded article of a rubber composition, which comprises the steps of:

(1) polymerizing ethylene, an α-olefin having 3 to 20 carbon atoms and a non-conjugated polyene in the presence of a catalyst made from a combination of a catalyst component having an average composition represented by the following formula (I) with an organoaluminum compound as a co-catalyst component represented by the following formula (II);

$$VO(OR)_m(OR')_nX_{3-m-n} \quad (I)$$

$$R''_kAlX_{3-k} \quad (II)$$

wherein R is an at least secondary hydrocarbon group having 1 to 8 carbon atoms; R' is a linear hydrocarbon group having 1 to 8 carbon atoms; X is a halogen atom; each of m and n is a positive number satisfying m+n≦3; R'' is a hydrocarbon group; and k is an integer satisfying 0≦k≦3; thereby producing an ethylene-α-olefin-non-conjugated polyene copolymer rubber (A) containing 50 to 90% by mole of an ethylene unit and 10 to 50% by mole of an α-olefin unit, the total amount of both units being 100% by mole;

having an iodine value of 1 to 50; and having an intrinsic viscosity of 2 to 5 dl/g measured in tetrahydronaphthalene at 135° C.;

(2) kneading at least 100 parts by weight of the ethylene-α-olefin-non-conjugated polyene copolymer rubber (A), 1 to 150 parts by weight of a reinforcement (B), and 1 to 150 parts by weight of a softener (C), thereby producing a kneaded product;

(3) mixing said kneaded product with 0.1 to 10 parts by weight of a vulcanizing agent (D), thereby producing a rubber composition; and (4) injection molding, compression molding or transfer molding said rubber composition, thereby producing a vulcanized molded article.

2. A vibration-proof material comprising a vulcanized molded article of a rubber composition produced by the process according to claim 1.

3. A process according to claim 1, wherein the catalyst component having an average composition represented by formula (I) and the organoaluminum compound as a co-catalyst component represented by formula (II) are both chlorinated.

4. A process for producing a vulcanized molded article of a rubber composition, which comprises the steps of:

(1) polymerizing ethylene, an α-olefin having 3 to 20 carbon atoms and a non-conjugated polyene in the presence of a catalyst made from a combination of a catalyst component having an average composition represented by the following formula (I) with an organoaluminum compound as a co-catalyst component represented by the following formula (II);

$$VO(OR)_m(OR')_nX_{3-m-n} \quad (I)$$

$$R''_kAlX_{3-k} \quad (II)$$

wherein R is an at least secondary hydrocarbon group having 1 to 8 carbon atoms; R' is a linear hydrocarbon group having 1 to 8 carbon atoms; X is a halogen atom; each of m and n is a positive number satisfying m+n<3; R" is a hydrocarbon group; and k is an integer satisfying 0≦k<3; thereby producing an ethylene-α-olefin-non-conjugated polyene copolymer rubber (A) containing 50 to 90% by mole of an ethylene unit and 10 to 50% by mole of an α-olefin unit, the total amount of both units being 100% by mole;

having an iodine value of 1 to 50; and having an intrinsic viscosity of 2 to 5 dl/g measured in tetrahydronaphthalene at 135° C.;

(2) kneading at least 100 parts by weight of the ethylene-α-olefin-non-conjugated polyene copolymer rubber (A), 1 to 150 parts by weight of a reinforcement (B), and 1 to 150 parts by weight of a softener (C), thereby producing a kneaded product;

(3) mixing said kneaded product with 0.1 to 10 parts by weight of a vulcanizing agent (D), thereby producing a rubber composition; and (4) injection molding, compression molding or transfer molding said rubber composition, thereby producing a vulcanized molded article.

5. The process according to claim 1, wherein the intrinsic viscosity range of the ethylene-α-olefin-non-conjugated polyene copolymer rubber (A) is 2 to 3.5 dl/g.

6. The process according to claim 4, wherein the intrinsic viscosity range of the ethylene-α-olefin-non-conjugated polyene copolymer rubber (A) is 2 to 3.5 dl/g.

* * * * *